Figure 2:
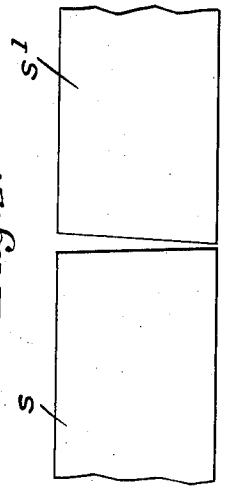

Aug. 26, 1941.                    L. IVERSEN                    2,253,709
                        WELDING OF LENGTHS OF STRIP METAL
                           Original Filed June 23, 1938

INVENTOR
Lorenz Iversen
by his attys,
Stebbins Blenko & Parmelee

Patented Aug. 26, 1941

2,253,709

UNITED STATES PATENT OFFICE 2,253,709

WELDING OF LENGTHS OF STRIP METAL

Lorenz Iversen, Pittsburgh, Pa., assignor to Mesta Machine Company, Pittsburgh, Pa., a corporation of Pennsylvania Original application June 23, 1938, Serial No. 215,388, now Patent No. 2,203,151, dated June 4, 1940. Divided and this application April 29, 1940, Serial No. 332,145

5 Claims. (Cl. 219—10)

This invention pertains to the art of welding lengths of strip metal together in end to end relation, and the present application is a division of my copending application Serial No. 215,388, filed June 23, 1938, now Pat. No. 2,203,151, dated June 4, 1940.

It is frequently desirable in certain metal working operations, as for example the cold rolling of metal or the continuous pickling of metal, to operate on pieces of greater length than the pieces produced from ordinary methods of manufacture. Thus it may be desirable to weld coils of hot rolled strip end to end to form larger coils for subsequent cold reduction or for continuous passage through a pickling unit.

Strip metal as referred to in the present application refers to flat rolled metal of uniform thickness having a width many times its thickness and in general, a length many times its width. As pointed out in my aforementioned patent, it is desirable when welding strips in end to end relation to employ the process of flash welding. In the art of flash welding, as this term is understood in the industry, the edges of metal to be joined together, being connected to opposite poles of a source of welding current, are first touched together and then separated to cause an arc to flash between the edges of the pieces to be joined. This arc causes the temperature of the metal to be raised to the melting point and when the metal has thus been heated, the two edges are pushed together to form a welded joint. Flash welding is desirable because the weld is more even than where electric butt welding is employed, and the metal is not destructively burned to the same extent.

Flash welding as heretofore employed has usually been in connection with the joining together of pieces of sheet metal where there is relatively little difference between the length and the width of the sheets being joined. For example, it has heretofore been proposed to weld two sheets along their long edges in order to make a single large sheet from which an automobile body could be pressed. In the flash welding of sheets it has been considered desirable to initially clamp the edges of the sheets to be joined at a slight angle to each other so that when one edge is moved toward the other, the initial contact will be made at one corner. Then the sheets are separated slightly and the resulting arc will flash across the full width of the gap between the two edges to be welded, the arc starting at the point of initial contact and spreading rapidly to the widest part of the gap separating the two edges. This very slight angularity between the edges of two sheets to be welded presents no particular difficulty. It will be apparent, however, that if two long strips of sheet metal are to be welded in end to end relation, and if they are skewed around so as to bring the edges which are to be joined into non-parallel relation to each other, the remote ends of the two strips by reason of the great length of the strips will be materially displaced with respect to a center line passing longitudinally through the weld. The flash welding of the strip ends in non-parallel relation would, therefore, produce a permanent camber in the composite strip.

According to the present invention there is provided a method for the flash welding of long strips in end to end relation which permits of the ends being initially brought together in a non-parallel relation but which will avoid any such camber or misalinement of the opposite ends of the composite strip. This may be accomplished in either of two ways. According to one method, the ends of the strip instead of being cut off square are cut off at an angle such that when the edges of the two strips are in alinement the ends will be non-parallel, the ends being trimmed to provide the proper taper in the gap between the two ends when they are brought together. When the welding is accomplished, more metal is forced into the joint where the ends are closest together and less metal is forced into the joint where the ends are furthest apart. In other words, if the ends of the two strips are trimmed in this fashion and one strip is held stationary during the welding while the other strip is pushed up to form the weld, both edges of the movable strip being moved the same distance, more metal will be forced into the weld at points where the ends were originally in closest proximity than where the ends were most widely separated. As a preferred alternative, my invention contemplates that camber may be eliminated by leaving the ends of the metal which are to be joined square and modifying the push-up so that during the welding operation one side of the strip is advanced further than the other to prevent any camber from being produced.

Figure 1:
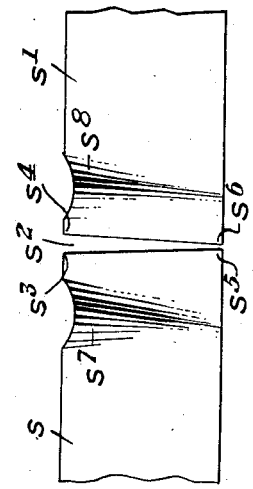

The method of my invention is illustrated diagrammatically in the accompanying drawing. In the drawing, Figure 1 is a schematic view showing a preferred method of welding the strips according to my invention; and Figure 2 is a similar view showing a modified method.

In explaining the method of my invention, it will be assumed that the strips to be joined have had their ends squared and are disposed end to end in a welder such as that shown in my aforementioned patent.

It has been heretofore stated that it is desirable initially to position the edges of the strips to be welded out of parallelism with one another. In order to secure this non-parallel positioning of the ends, assuming that the ends are sheared off square, the link 65 supporting one end of the gauger 60 of my aforementioned patent is made slightly shorter than the corresponding link at the other end of the gauger. By reason of this the gauger is inclined crosswise of the machine to a very slight extent which is the equivalent of making the gauger slightly wider at one end than the other.

In using the apparatus of my aforementioned patent, the trailing end of the strip which has passed through the welder is forced back by the pinch rolls F until it firmly contacts with the gauger when the gauger is in its lower position. Since the gauger is tilted in a crosswise position and therefore the apex of the wedge is lower at one side of the strip than at the other, the square end of the strip in order to contact with the gauger across the full width of the strip, will be arrested by the gauger first at one side of the strip and then at the other. This in turn means that a slight buckle will be formed in the trailing end of the strip back of the gauger.

The leading end of the oncoming strip will, in like manner, be forced against the opposite face of the gauger and as the front end of this strip is also square, a buckle will be formed in the front portion of the oncoming strip. It will thus be seen that when the ends of the two sheets have been forced into contact with the gauger throughout their entire width, these ends will be in a non-parallel position with reference to each other. When they are in this position the upper jaws of the welder are moved downwardly against the lower jaws and the strip ends are firmly clamped for welding. The gauger is then withdrawn and the welding operation may be proceeded with.

Figure 1 illustrates in a greatly exaggerated fashion the condition of the two sheets at the time they are so clamped. The trailing end of the first strip is designated S and the following sheet is designated S¹. The withdrawal of the gauger leaves the ends in non-parallel relation, there being a wedge-shaped gap S² between them. Since the points S³ and S⁴ contact the gauger first and the points S⁵ and S⁶ have to move furthest to contact the gauger, a buckle S⁷ is thrown into the sheet S which buckle decreases in magnitude across the strip, and a similar buckle S⁸ is formed in the strip S¹.

The formation of the buckle in the sheets is facilitated by locating the plane of welding out of the plane of normal strip travel, preferably below it.

According to the present invention it is contemplated that the buckle thus formed in the two strips may be removed in the operation of welding as otherwise the edges of the two welded strips would be in permanent misalinement or a slight camber would result in the composite strip. This is preferably accomplished by advancing the buckled edge of the strip S¹ further in the operation of welding than the opposite edge a distance sufficient to relieve the buckle in both of the strips. This may be easily done by making the cam inserts 53e of the push-up cams 53 of the welder shown in my aforementioned patent, higher at one side of the machine than at the other and allowing sufficient play to permit one side of the clamping jaws to be advanced slightly more than the other side. In addition the machine may be assembled in such manner that it will "give." When it is considered that in the welding of strip 90″ wide the ends of the strips need only be $\frac{3}{32}$″ out of parallelism, it will be apparent that a very slight amount of play or looseness is necessary to permit the one edge of the strip to be advanced enough further than the other to relieve the buckle or camber.

Initial contact between the strips is made first at the corners S⁵ and S⁶ (Figure 1) and as soon as these points contact, the strip ends are pulled apart very slightly to initiate the flashing. The flashing progresses rapidly across the entire width of the joint, and the cams 53 cause the strips to slowly approach each other as the metal at the edges of the strip burns away in being brought up to a welding temperature. When the edges are at a proper welding temperature, the portions 53e of the cams 53 then bring about the push-up which completes the weld. At the time of the push-up the welding current is interrupted. By reason of the cam insert 53e at one side of the machine being slightly higher than the corresponding insert at the other, the buckled edge of the strip S¹ is advanced slightly further than the opposite edge relieving the buckle at S⁸ and normally tending to produce a lesser reversed buckle in the opposite edge of the strip. On opening of the clamping jaws all of the buckle will be removed from the joined strip.

Thus it will be seen that in the preferred practice of my invention the ends of the strip are initially thrown out of parallelism, a buckle being thrown into each strip but that this buckle is relieved and any camber in the composite strip prevented by advancing one side of the strip slightly further than the other in completing the weld.

Figure 2 illustrates a modification of the present invention in which the ends of the strip S and S¹, instead of being cut off square and then clamped in a non-parallel position by throwing a buckle into each of the strips, are cut off at reverse angles.

When the edges are trimmed in this manner, they will be in a non-parallel relation, as shown in Figure 2, and can be clamped in such relation without any buckle being put in either of the strips. When the ends of the strips are trimmed in this fashion, both edges of the strip S¹ are pushed up in the operation of the welding to the same extent. In both methods the weld is secured without any camber being produced in the resulting composite strip. In both methods the ends of the strips are clamped in a non-parallel relation, and in both methods the elimination of camber is accomplished by controlling the movement of the jaws in correlation to the shape of the ends in a manner such as to correct the original non-parallel relation of the ends. In the method shown in Figure 1, the buckled side is pushed up further than the opposite side of the strip and in the method shown in Figure 2, both edges of the strip are moved to the same extent, but by reason of the angle at which the metal is cut off, more metal is forced into the weld at the corners $S^5$—$S^6$ than at the corners $S^3$—$S^4$. Broadly speaking, therefore, my invention makes possible the flash welding of strip material without camber in the resulting composite strip by pushing more metal into the weld at one edge of the strip than at the other to compensate for the ends of the strip being initially in a non-parallel relation, this non-parallel relation being necessary to initiate the operation of flash welding. Of the two methods described, the one in which the ends are trimmed off square is preferable because the shearing of the ends is simpler. In other words, by cutting both ends off square, the operation is simplified over the operation of cutting the two edges to be welded at reverse angles. Under some circumstances, it might be desirable to weld the strips diagonally, or in some manner other than at right angles to the length of the strip, and my invention contemplates that whether the weld is transverse, or diagonal, or in any direction other than transverse to the longitudinal axis of the strips, the operation of trimming the ends and welding is so performed that the edges are first clamped in non-parallel relation and then pushed up in the final welding operation in a manner to avoid camber in the completed strip.

While I have illustrated and described a preferred practice of my invention and a modification, it will be understood that the method herein described may be modified within the contemplation of my invention, that various changes may be made therein and that the method is not restricted to the particular apparatus of my aforementioned patent.

I claim:

1. The method of flash-welding long, thin, flat pieces of sheet metal in end-to-end relation which comprises disposing the ends of the pieces in non-parallel relation while maintaining the axes of the pieces alined and their sides parallel for a great portion of their length at least, abutting the ends at one side of the pieces and passing electric current therebetween while maintaining said alinement of the pieces and the parallelism of their sides for a great portion of their length, then controlling the push-up of the pieces as the ends thereof are heated to welding temperature so as progressively to produce a line flash-weld between the ends, and so that when the weld is completed, the sides of the connected pieces will be substantially parallel.

2. The method of flash welding long strips of thin, flat, sheet metal in end-to-end relation which comprises shearing the ends to be welded, bringing the ends together in non-parallel relation and, while maintaining the axes of the strips alined and their sides parallel for a great portion of their length, at least, progressively producing a line flash-weld joining the ends, and correlating the shearing of the ends and the rates of push-up of the two sides of the strips during welding to secure parallelism of the sides of the respective strips after welding.

3. The method of flash welding long lengths of relatively wide, thin, metal strip in end-to-end relation which comprises squaring the ends to be welded, establishing a converging gap between the squared ends by throwing a buckle into at least one of the strips while maintaining the axes of the strips generally in alinement throughout a great portion of their length, progressively forming a line flash-weld joining said ends while continuing to maintain said alinement, and pushing up the buckled strip more on one side than the other, thereby removing the buckle as the weld is completed.

4. The method of flash welding long strips of relatively thin, flat, metal strip in end-to-end relation which comprises squaring the ends to be welded, establishing a converging gap between the ends by throwing a buckle into adjacent edges of the strips while maintaining the axes of the strips generally in alinement throughout a substantial portion of their length, progressively forming a line flash-weld joining the ends while continuing to maintain said alinement, pushing up the buckled side of one strip more than the other side thereof so that the buckle is completely removed when the ends are welded and released.

5. In a method of welding long, thin pieces of flat-rolled metal end to end, the steps including shearing the ends of the pieces, disposing said ends in a common plane, establishing a converging gap between said ends while maintaining the axes of the pieces alined and their sides parallel, at least for a great portion of their length, progressively producing a line flash-weld joining said ends while continuing to maintain said alinement and parallelism, and so correlating the rates of push-up of the two sides of one piece with the shearing of the ends that on completion of the weld the sides of the pieces, respectively, are parallel when the pieces are maintained flat.

LORENZ IVERSEN.